US012600189B2

(12) United States Patent
Payagalage-Don et al.

(10) Patent No.: US 12,600,189 B2
(45) Date of Patent: Apr. 14, 2026

(54) CONTROL SYSTEM AND METHOD FOR VEHICLE SUSPENSION

(71) Applicant: JAGUAR LAND ROVER LIMITED, Coventry (GB)

(72) Inventors: Nipun Payagalage-Don, Coventry (GB); James Robertson, Coventry (GB); Robert Neilson, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 18/702,250

(22) PCT Filed: Oct. 21, 2021

(86) PCT No.: PCT/EP2021/079190
§ 371 (c)(1),
(2) Date: Apr. 17, 2024

(87) PCT Pub. No.: WO2023/066487
PCT Pub. Date: Apr. 27, 2023

(65) Prior Publication Data
US 2025/0242648 A1     Jul. 31, 2025

(51) Int. Cl.
*B60G 17/016* (2006.01)
*B60W 30/14* (2006.01)

(52) U.S. Cl.
CPC .... *B60G 17/016* (2013.01); *B60G 2400/0512* (2013.01); *B60G 2400/106* (2013.01);
(Continued)

(58) Field of Classification Search
CPC .......... B60G 17/016; B60G 2400/0512; B60G 2400/106; B60G 2500/10; B60G 2500/22;
(Continued)

(56) References Cited

U.S. PATENT DOCUMENTS 9,586,454 B2    3/2017   Yamazaki
2007/0088475 A1*   4/2007   Nordgren ............. B60G 17/018
701/37
(Continued)

FOREIGN PATENT DOCUMENTS

JP    2001341511 A    12/2001
KR    20120083146 A    7/2012

OTHER PUBLICATIONS

ISA European Patent Office, International Search Report and Written Opinion Issued in Application No. PCT/EP2021/079190, Jul. 26, 2020, WIPO, 21 pages.

*Primary Examiner* — Toan C To
(74) *Attorney, Agent, or Firm* — McCoy Russell LLP

(57) ABSTRACT

A control system for a vehicle is provided, the control system comprising one or more controllers, the control system configured to receive an acceleration or deceleration demand signal from an automatic cruise control system, and request modification of one or more parameters of the vehicle suspension system in response to the received acceleration or deceleration demand signal. In this way, the vehicle suspension system may be modified in preparation for an acceleration or deceleration of the vehicle, to inhibit or at least reduce the occupants of the vehicle experiencing an undesirable pitching movement of the vehicle during the course of the change in speed of the vehicle.

14 Claims, 5 Drawing Sheets

(52) U.S. Cl.
    CPC ...... *B60G 2500/10* (2013.01); *B60G 2500/22*
        (2013.01); *B60G 2800/014* (2013.01); *B60W*
        *30/14* (2013.01); *B60W 2520/16* (2013.01)
(58) Field of Classification Search
    CPC ........... B60G 2800/014; B60W 30/14; B60W
        2520/16
    See application file for complete search history.

(56)                       References Cited

U.S. PATENT DOCUMENTS

| 2015/0203116 A1* | 7/2015 | Fairgrieve .............. B60T 8/175 |
| | | 701/93 |
| 2017/0369053 A1* | 12/2017 | Nogimori ............ B60W 30/12 |
| 2018/0050696 A1* | 2/2018 | Misu ................... A61B 5/6893 |
| 2018/0144640 A1* | 5/2018 | Price ................... G05D 1/0055 |
| 2020/0070802 A1* | 3/2020 | Yamada ............... B60W 30/02 |
| 2020/0079373 A1* | 3/2020 | Ortmann .............. B60W 10/08 |
| 2020/0216058 A1* | 7/2020 | Aggoune .......... B60W 60/0023 |
| 2020/0269849 A1* | 8/2020 | Kang .................. G06V 20/597 |
| 2020/0384980 A1* | 12/2020 | Yu ........................ G05D 1/0088 |
| 2021/0053409 A1* | 2/2021 | Kim ...................... B60G 17/06 |
| 2021/0114584 A1* | 4/2021 | Hiratsuka ............ B60W 30/00 |
| 2022/0229446 A1* | 7/2022 | Switkes ............. B60W 30/165 |

* cited by examiner

CONTROL SYSTEM AND METHOD FOR VEHICLE SUSPENSION

CROSS REFERENCE TO RELATED APPLICATIONS

The present application is a U.S. National Phase of International Application No. PCT/EP2021/079190 entitled "CONTROL SYSTEM AND METHOD FOR VEHICLE SUSPENSION," and filed on Oct. 12, 2021. The entire contents of each of the above-listed applications are hereby incorporated by reference for all purposes.

TECHNICAL FIELD

The present disclosure relates to a control system and method for vehicle suspension. Aspects of the invention relate to a control system, a method of controlling vehicle suspension, a computer program and a vehicle. Embodiments of the present disclosure relate to control of a vehicle suspension system based on an acceleration demand signal from an automatic cruise control system.

BACKGROUND

It is known to provide vehicles with adjustable suspension. The adjustable suspension may be semi active or fully active, taking into account information from vehicle systems and/or external sensors to continuously adjust the suspension settings to cater for road surfaces and terrain features as they are traversed. The suspension settings being varied may be physical parameters such as damper rate and spring stiffness. However, there is an inherent compromise in any passenger road vehicle's suspension system, between its ability to isolate the occupants of the vehicle from vibrations from the road and its ability to supress primary body motion under acceleration and deceleration.

Adaptive Cruise Control (ACC) systems widely available in vehicles on the market often share a common ability in being able to hold a vehicle's speed at a user prescribed value without the need for additional input from the driver via the throttle pedal. This is extended to the vehicle's ability to identify slower moving traffic ahead of the vehicle and adjust the vehicle's speed accordingly to match the upcoming traffic's speed at a fixed distance from it. Additionally, if the traffic no longer exists, the system is then able to accelerate the vehicle back to the driver's desired holding speed.

One potential side-effect of the automatic cruise control system's ability to accelerate and decelerate the vehicle, is the induced pitch motion of the vehicle body which is detrimental to the vehicle occupant's comfort.

It is an aim of the present invention to address one or more of the disadvantages associated with the prior art.

SUMMARY OF THE INVENTION

Aspects and embodiments of the invention provide a control system, a method of controlling vehicle suspension, a computer program and a vehicle, as claimed in the appended claims.

According to an aspect of the invention, there is provided a control system for a vehicle, the control system comprising one or more controllers, the control system configured to:
receive an acceleration or deceleration demand signal from an automatic cruise control system; and request modification of one or more parameters of the vehicle suspension system in response to the received acceleration or deceleration demand signal.

In this way, the vehicle suspension system may be modified in preparation for an acceleration or deceleration of the vehicle, to inhibit or at least reduce the occupants of the vehicle experiencing an undesirable pitching movement of the vehicle during the course of the change in speed of the vehicle.

The one or more controllers may collectively comprise:
at least one electronic processor having an electrical input for receiving the acceleration or deceleration demand signal; and
at least one memory device electrically coupled to the at least one electronic processor and having instructions stored therein;
and wherein the at least one electronic processor is configured to access the at least one memory device and execute the instructions thereon so as to modify the one or more parameters of the vehicle suspension system.

The control system may be configured to calculate a theoretical pitch change to the vehicle in dependence on the received acceleration or deceleration demand signal, the control system being configured to request said modification to oppose the theoretical pitch change. In this case, a variable adjustment of the one or more suspension parameters may be provided, with the degree of adjustment being proportional to the expected pitch change.

In the case of an acceleration demand signal, the vehicle suspension system may be modified to at least partially counteract pitch backwards motion of the vehicle, and in the case of a deceleration demand signal, the vehicle suspension system may be modified to at least partially counteract pitch forwards motion of the vehicle. In some implementations, the modifications may be the same in both cases, and in other implementations the vehicle suspension system may be adjusted differently depending on whether the vehicle is due to slow down or speed up.

The control system may be configured to compare a rate of acceleration or deceleration indicated by the acceleration or deceleration demand signal with a threshold, and to request modification of the one or more parameters of the vehicle suspension system in dependence on the result of the comparison. Small accelerations or decelerations may not require any adjustment of the suspension system, since the amount of pitch forwards or backwards is likely to be small. More than one threshold may be used. For example, exceeding a first, lower, threshold may result in a first modification of the suspension parameters, to oppose a relatively small amount of pitch forwards or backwards, whereas exceeding a second, higher threshold may result in a second modification of the suspension parameters. In particular, the second modification may involve a greater level of adjustment than the first modification. It will be appreciated that a greater number of thresholds may be used, or that the amount of adjustment may be continuous as a function of the amount of acceleration of deceleration indicated in the acceleration or deceleration demand signal. In this case, an amount by which the one or more parameters are requested to be modified may be dependent on (and calculated from) a rate of acceleration or deceleration indicated by the acceleration or deceleration demand signal.

In the case of an acceleration demand signal, the rate of acceleration demanded may be compared with a first threshold, and the request to modify the one or more parameters of the vehicle suspension system is made if the rate of positive acceleration exceeds the first threshold, and in the case of a deceleration demand signal, the rate of deceleration demanded may be compared with a second threshold, and the request to modify the one or more parameters of the vehicle suspension system is made if the rate of deceleration is greater than the second threshold. It will be appreciated that the magnitude of the first and second thresholds may be the same, or may be different. In particular, due to the longitudinal asymmetry of the vehicle, and the different occupant experience of accelerating versus decelerating, a pitch forward and pitch backward may be experienced differently, requiring different thresholds to be applied and/or requiring a different amount of suspension adjustment.

The one or parameters being adjusted may comprise a spring rate and/or a damping rate of one or more elements of the suspension system, and the modification may comprise increasing the spring rate and/or the damping rate of the one or more elements.

Generally, a pitching motion, whether backwards or forwards, may be reduced by increasing the stiffness and damping of the suspension system while the acceleration or deceleration takes place. Typically, an increase is applied to both the forward suspension assemblies and the rear suspension assemblies, irrespective of whether the pitching is forwards or backwards. The increase may be applied equally to each of the front and rear assemblies, or in some cases the increase may be applied unequally, such that a greater increase is applied to the front suspension compared with the rear suspension, or vice versa. The specifics of this may depend on the specifics of the vehicle, including its dynamics and weight distribution.

Adjustment of the one or more parameters of the vehicle suspension in response to the acceleration demand signal preferably occurs in advance of the vehicle accelerating or decelerating in response to the acceleration or deceleration demand signal. In other words, when the acceleration demand signal or deceleration demand signal is generated, first the suspension settings are adjusted, and then the vehicle is accelerated or decelerated.

The control system may be configured to revert the one or more parameters to their previous settings in response to an event/trigger. The event/trigger may be a reduction in a rate of acceleration, or of deceleration, to below a predetermined deactivation threshold.

The one or more controllers may comprise a first controller for generating the acceleration demand signal, a second controller for receiving the acceleration demand signal and responsive to the receipt of the acceleration demand signal generating a suspension modification request to modify the one or more parameters of the vehicle suspension system, and a third controller for receiving the suspension modification request and responsive to the suspension modification request to modify the one or more parameters of the vehicle suspension system. The third controller may be configured to generate a control output (for example a control current to be applied to the dampers and/or springs of the suspension system) to control the one or more parameters of the vehicle suspension system, in dependence on one or more driver and/or road inputs and the request. In some cases the first and second controllers may be different functions of the same hardware, with the third controller being implemented on different hardware (and connected to the first and second controller hardware via a network).

According to another aspect of the invention, there is provided a vehicle comprising a suspension system, an adaptive cruise control system, and a suspension control system according to the above.

The vehicle may further comprise one or more additional vehicle systems responsive to the acceleration demand signal, the first, second and third controllers and the additional vehicle systems being connected via a network, the first controller being configured to publish the acceleration demand signal on the network for reception by the second controller and the additional vehicle systems.

According to another aspect of the invention, there is provided a control method for vehicle suspension, the method comprising:

receiving an acceleration demand signal from an automatic cruise control system; and requesting modification of one or more parameters of the vehicle suspension system in response to the received acceleration demand signal.

According to another aspect of the invention, there is provided computer software that, when executed, is arranged to perform the method described above.

The request may be made to an adaptive suspension system. In this case the adaptive suspension system is configured to generate a control output to adjust the one or more parameters, the control output being generated using a control algorithm which is a function of one or more driver inputs and/or one or more road inputs, the control output being influenced by the request.

The control output may be influenced by varying one or more gains of the control algorithm in response to the request. A gain is a calibratable multiplier applied to a control signal that is intended to influence the output of the suspension controller controlling the adaptive suspension system.

The one or more parameters may be adjusted via current control of adaptive damping hardware and/or adjustable spring rate air springs.

The one or more parameters may comprise a stiffness of one or more dampeners of the vehicle suspension (spring rate) and/or a volume of one or more air springs (damping rate) of the vehicle suspension.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
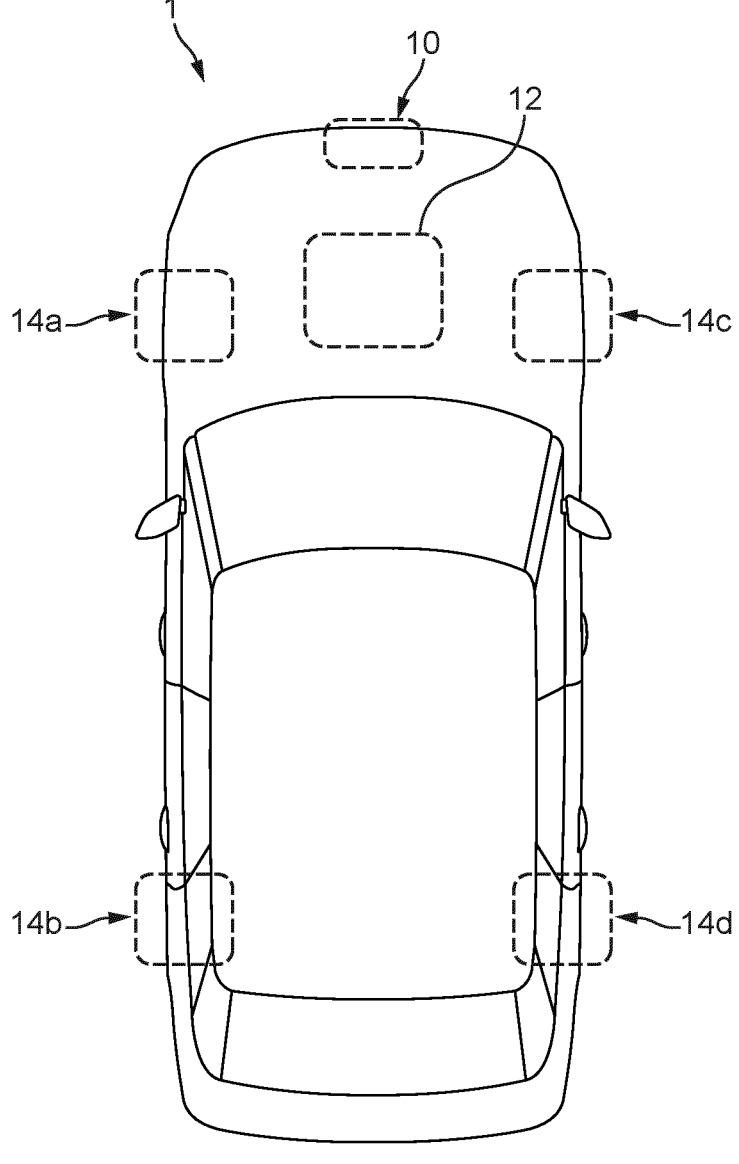
FIG. 1 shows a schematic representation of a vehicle having an adaptive suspension system, a cruise control system and a vehicle controller.

A vehicle 1 in accordance with an embodiment of the present invention is described herein with reference to the accompanying FIG. 1.

With reference to FIG. 1, the vehicle 1 comprises a forward-looking sensor 10, which may for example be an imaging device such as a camera, radar, lidar or any other sensor capable of detecting the presence of objects ahead of the vehicle 1. The vehicle 1 also comprises a control system 12 (which itself comprises one, or generally many, controllers for carrying out various vehicle functions, as will be explained below) which is connected (wirelessly or wired) to the forward-looking sensor 10. The vehicle 1 also comprises four suspension assemblies (springs and dampers) 14a, 14b, 14c, 14d each providing a respective wheel of the vehicle 1 with a suspension capability. The four suspension assemblies 14a, 14b, 14c, 14d are controlled by the control system 12, generally by adjusting a damping current and/or air spring volume of the dampers and springs to increase or decrease an amount of damping, and increase or decrease the stiffness of the springs. By adjusting these parameters of the suspension assemblies—individually or as a group—it is possible to both generally influence the handling and refinement of the vehicle 1, and also dynamically adapt the suspension system to cope with road surface features such as bumps to improve refinement for the occupants of the vehicle 1. The control system 12 includes cruise control functionality, which is able to maintain a desired vehicle speed without input from the driver. As part of this functionality, the cruise control is able, during a follow mode, to detect the presence of and distance to vehicles ahead, and increase or decrease the vehicle speed automatically to keep with the flow of traffic.

Figure 2:
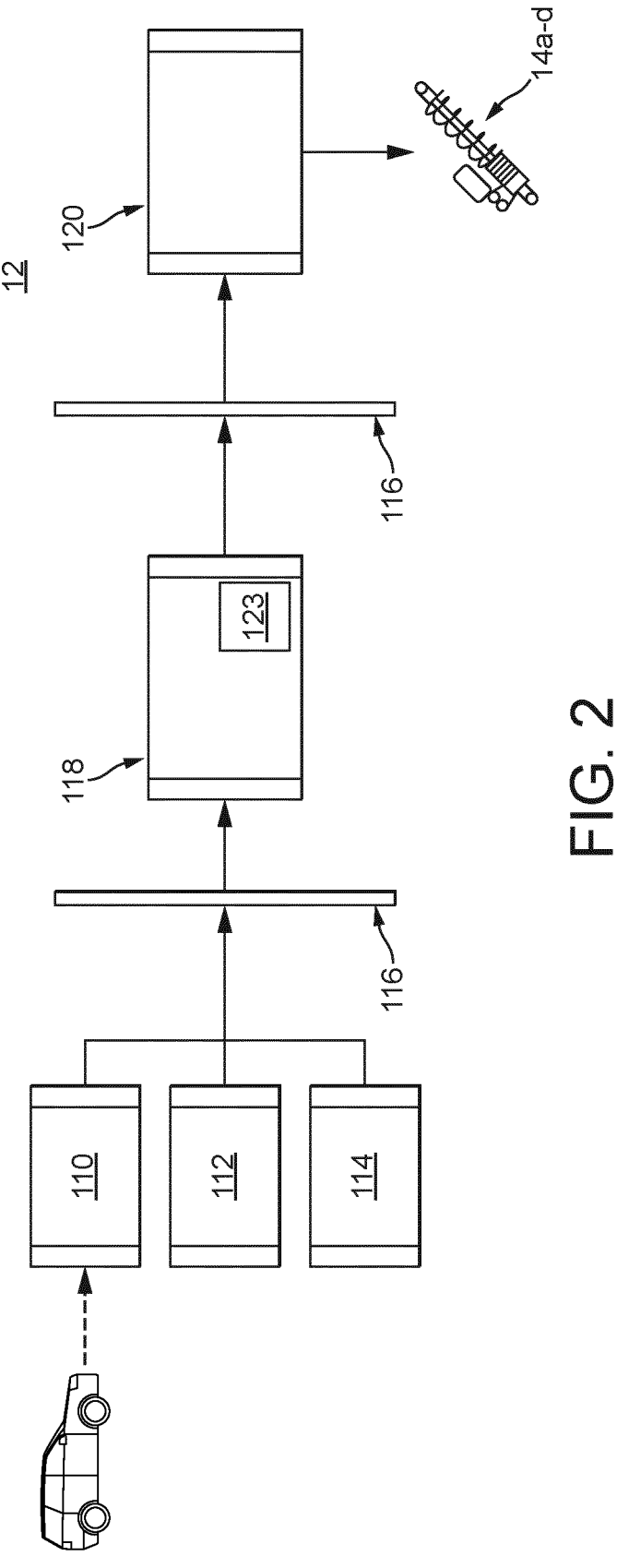
FIG. 2 shows a control system for implementing the present technique.

An example control system (such as the vehicle controller 12 of FIG. 1) in accordance with an embodiment of the present invention is described herein with reference to the accompanying FIG. 2. Generally, vehicle controller systems are of a modular nature, both structurally and functionally. Here, the control system 12 comprises an anti-lock braking system (ABS) 110, a gateway module (GWM) 112 and a car configuration file (CCF) 114. These systems are able to output data or parameters which are used in the present technique. These systems are connected via a network 116 to a driver assistance domain controller (DADC) 118. The DADC 118 is connected via the network 116 to a suspension control function 120 hosted on an Integrated Suspension Control System (ISCS). The suspension control function 120 provides active suspension control for the vehicle 1 by continuously adjusting control parameters of the suspension assemblies 14a, 14b, 14c, 14d. In particular, control currents for the dampers and the air spring volumes of the suspension assemblies 14a, 14b, 14c, 14d are individually and dynamically controlled by the suspension control function 120. That is, the various controllable parameters of the suspension system comprise a spring rate and/or a damping rate of one or more elements of the suspension system (such as a damper or an air spring), and the modification implemented in response to an acceleration or deceleration demand comprises increasing the spring rate and/or the damping rate of the one or more elements. Increasing the spring rate will have the effect of making the suspension stiffer, while increasing the damping rate will have the effect of increased dampening of vibration/oscillation of the suspension system.

The ABS 110 outputs, onto the network 116, a vehicle overground speed and a target longitudinal acceleration (which may be positive, representing an acceleration demand, or negative, representing a deceleration demand). The GWM 112 outputs, onto the network 116, a current terrain mode for the vehicle 1 (which may be automatically set, or manually set by the driver). This information may be used to determine whether the present technique can be used, since it may not be applied when the vehicle is operating in certain terrain modes. The CCF 114 outputs, onto the network 120, one or more CCF values. The CCF 114 comprises a list of configurable parameters hosted on the Gateway Module (GWM) 112, and communicates to all of the other ECUs (controllers) on the vehicle 1 which features should be present. That is, the CCF 114 is a list of switches to tell the vehicle 1 (or more specifically its controllers) which features should be active.

The DADC 118 provides a pre-emptive suspension function, and also provides a cruise control function. The latter is hosted and read internally on the DADC 118, as an acceleration (ACC) request/demand signal intended for the powertrain control unit (which will respond to the request/demand to increase the vehicle speed). The DADC 118 is able to make suspension modification requests to the suspension control function 120 in dependence on the acceleration request/demand signal. The acceleration demand signal from the ACC system may have either a positive or negative value. The DADC 118 will (or may) make a different type of suspension modification request dependent on whether the acceleration demand signal has a positive or negative value (as well as optionally based on the magnitude of the acceleration demand signal). In particular, the suspension modification request signal from the pre-emptive suspension feature may request adjusting the suspension settings in either the positive or negative direction, to respectively compensate for a particular direction of pitching of the vehicle. In both cases this adjustment involves increasing the stiffness and/or damping of both the front and rear suspension. However, the amount of the increase (for a given level of acceleration or deceleration, in the case of multiple magnitude thresholds) may be different for backwards pitching (acceleration) compared with forwards pitching (deceleration).

With the automatic cruise control system in a follow mode, the vehicle speed is adjusted according to traffic ahead. The automatic cruise control system will adjust the vehicle speed to maintain a safe distance from the vehicle ahead. If the traffic in front of the vehicle is no longer present, the automatic cruise control system will accelerate the vehicle back up to the desired target speed.

The pitch control functionality continually monitors these changes in cruise control acceleration demand and if it determines that the demand exceeds a calibratable threshold value in either positive or negative directions, will request a modification in feed forward pitch acceleration and velocity gain from ISCS. The threshold may be calibrated in the same manner as other suspension control parameters, to achieve the optimum balance of ride comfort and body control. This calibration is carried out during the development and tuning phase of the vehicle programme by an engineer, rather than dynamically by the vehicle. Requests made to the ISCS are processed within the feed forward element of pitch control (driver induced motion). Damper and air spring force requests are arbitrated with other local modifiers prior to conversion into damper/spring currents. That is, the suspension control system sets physical parameters for the springs and dampers of the suspension system using control currents, and sets the values of the control currents in dependence on a control algorithm having two main components. The first component receives road inputs, such as information on the road surface and bumps ahead, and influences the control current to conform the suspension system to these. The second component takes account of driver inputs, such as driver-induced acceleration, braking and turning, and adjusts the suspension system to maintain desired motion of the vehicle body. The present technique adjusts the latter part of the control algorithm, in one implementation by adjusting gains applied to the driver related inputs and/or outputs from this part of the algorithm. In other words, the present technique modifies the responsiveness (sensitivity) to driver inputs, based on the amount and direction of acceleration demanded by the automatic cruise control system. That is, with the present technique, damper and DAS current demands are modified after arbitration of feed forward force requests, and conversion to current. For these purposes, the acceleration demand signal published by the ACC system is treated as a driver input. The delay between the generation of the acceleration demand from the automatic cruise control system and its implementation by the powertrain control unit will allow the suspension system to implement the configuration change pre-emptively.

Pitch damping and pitch stiffness can be scaled up from their base passive value when both adaptive dampers and switchable volume air springs are present at all 4 corners of the vehicle. The present technique is able to identify if the imminent pitch event is either a pitch forward motion due to a braking event, or a pitch rearward motion due to an acceleration event. In doing so, it is able to request changes to pitch control from the Suspension Control System in either direction independently.

The Suspension Control System (ISCS) itself is able to scale the pitch damping and/or pitch stiffness within the hardware described previously by a different value in either direction. Therefore, unique pitch resistance in a forward or rearward direction is possible.

The adjustments are made downstream of the DADC controller 118, by the Suspension Control System 120 which receives the request for alteration from the DADC 118 and modifies existing gains applied in a control algorithm administered by the suspension control system 120. A separate gain adjustment can be applied in the pitch forward direction or the pitch rearward direction, allowing independent modification of gains in acceleration or braking.

The control system 12 may be considered to comprise a plurality of controllers 110, 118, 120 and is configured to respond to the acceleration status signal (which may be generated by one of the controllers, in this case by the controller 118), to modify one or more parameters of the vehicle suspension system in response to direction and magnitude of the acceleration status signal. In an alternative arrangement a single controller may be provided to implement all functionality.

It is to be understood that the or each controller within the control system 12 can comprise a control unit or computational device having one or more electronic processors (e.g., a microprocessor, a microcontroller, an application specific integrated circuit (ASIC), etc.), and may comprise a single control unit or computational device, or alternatively different functions of the or each controller in the control system 12 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller to implement the control techniques described herein (including some or all of the functionality required for the method described herein). The set of instructions could be embedded in said one or more electronic processors of the controller; or alternatively, the set of instructions could be provided as software to be executed in the controller. A first controller or control unit may be implemented in software run on one or more processors. One or more other controllers or control units may be implemented in software run on one or more processors, optionally the same one or more processors as the first controller or control unit. Other arrangements are also useful.

In the example illustrated in FIG. 2, each of the controllers 110, 118, 120, comprises at least one electronic processor having one or more electrical input(s) for receiving one or more input signal (from one or more of the other controllers), and one or more electrical output(s) for outputting one or more output signal(s) (to one or more of the other controllers). As mentioned, the input and output signals may be communicated via the network 116. That is, in FIG. 2 the various controllers are electronically coupled together via the network 116. The or each controller may further comprises at least one memory device electrically coupled to the at least one electronic processor and having instructions stored therein. This is shown for the controller 118, which can be seen to comprise a memory 123. The at least one electronic processor 118 is configured to access the at least one memory device 123 and execute the instructions thereon so as to modify the one or more parameters of the vehicle suspension system in dependence on an acceleration demand signal.

The, or each, electronic processor may comprise any suitable electronic processor (e.g., a microprocessor, a microcontroller, an ASIC, etc.) that is configured to execute electronic instructions. The, or each, electronic memory device 123 may comprise any suitable memory device and may store a variety of data, information, threshold value(s), lookup tables or other data structures, and/or instructions therein or thereon. In an embodiment, the memory device 123 has information and instructions for software, firmware, programs, algorithms, scripts, applications, etc. stored therein or thereon that may govern all or part of the methodology described herein. The processor, or each, electronic processor may access the memory device 123 and execute and/or use that or those instructions and information to carry out or perform some or all of the functionality and methodology described herein.

The at least one memory device 123 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

An example controller 118 has been described comprising at least one electronic processor configured to execute electronic instructions stored within at least one memory device 123, which when executed causes the electronic processor(s) to carry out the method as hereinbefore described. A similar structure may be provided for each of the controllers 110, and 120. However, it will be appreciated that embodiments of the present invention can be realised in any suitable form of hardware, software or a combination of hardware and software. For example, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

Figure 3:
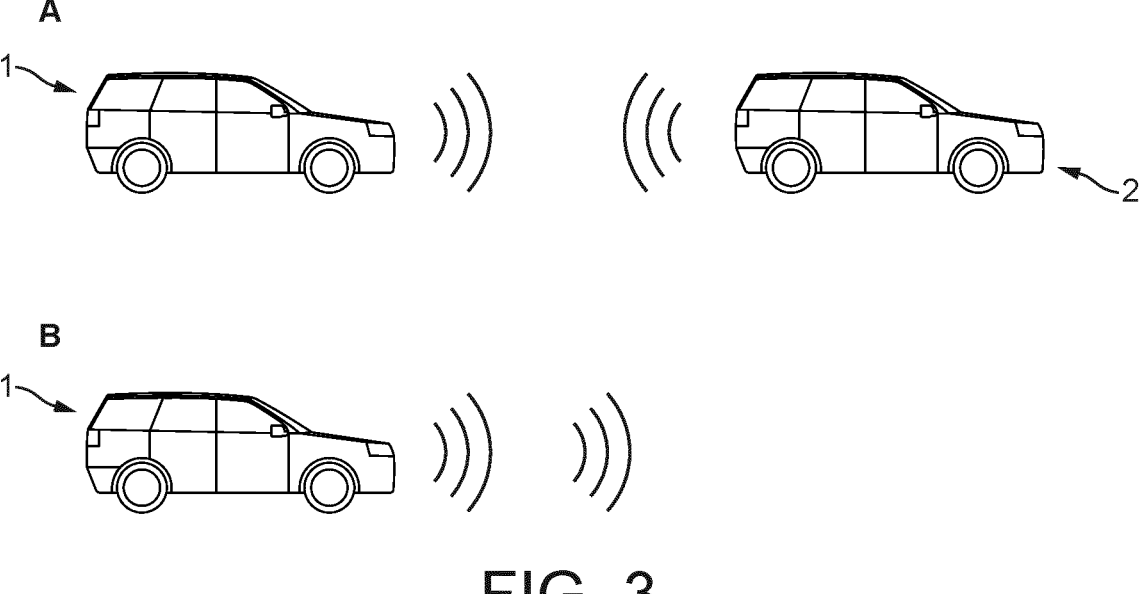
FIG. 3 shows the use of the technique to reduce pitching forwards and backwards as the cruise control system increases and reduces the speed of the vehicle.

An example use case for the present technique in accordance with an embodiment of the present invention is described herein with reference to the accompanying FIG. 3. Two stages of the use case are shown with respect to time, these progressing from a stage A to a stage B.

While the automatic cruise control system is in follow mode, it will adjust vehicle speed to maintain a safe distance from the vehicle ahead, causing the vehicle to pitch forward. With traffic clear, the automatic cruise control system will accelerate to the requested vehicle speed, causing the vehicle to pitch backward.

In both cases, the present technique will pre-emptively increase pitch damping to counteract the pitch event if necessary.

In stage A, the control system 12 of the vehicle 1 monitors the area ahead of the vehicle 1 using mid-range radar (MRR) and a forward looking camera. In Stage A, a second vehicle 2 is detected relatively closely ahead of the vehicle 1, such that the cruise control system is required to decelerate the vehicle 1 to avoid a collision and keep moving with the flow of traffic. A deceleration demand (to slow the vehicle 1) is therefore generated by the control system 12, and in response to the deceleration demand an action is taken to either apply the (friction or regenerative) brakes of the vehicle to slow it, or to slow the vehicle down via a reduction in engine torque, application of gear change, and the application of engine braking. Since this deceleration would normally cause the vehicle 1 to pitch forward, an action is also taken to adjust the suspension settings to mitigate or eliminate the pitching forwards of the vehicle 1. The suspension adjustment takes place prior to the braking taking place.

In stage B, the area ahead of the vehicle is determined to be empty. As such, the vehicle 1 is able to return to a set speed for the cruise control system (without driver intervention being required). An acceleration demand (to increase the speed of the vehicle 1) is therefore generated by the control system 12, and in response to the acceleration demand an action is taken to increase engine torque to accelerate the vehicle 1. Since this acceleration would normally cause the vehicle 1 to pitch (or sit) backwards, an action is also taken to adjust the suspension settings to mitigate or eliminate the pitching backwards of the vehicle 1. Again, the suspension adjustment takes place prior to the vehicle acceleration taking place.

As a result of these interventions, the occupants of the vehicle 1 will experience a smoother experience with reduced pitching.

Figure 4:
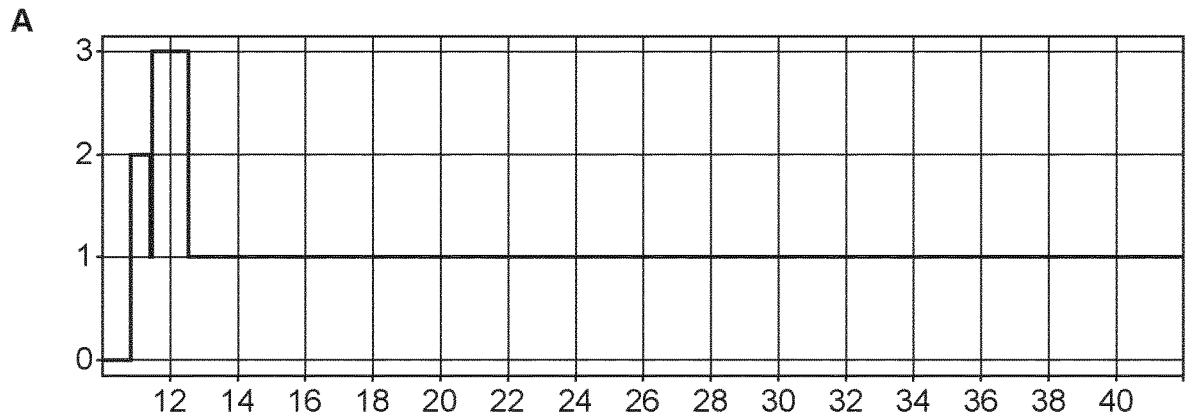
FIG. 4 shows a set of graphs relating to present technique.
Figure 4:
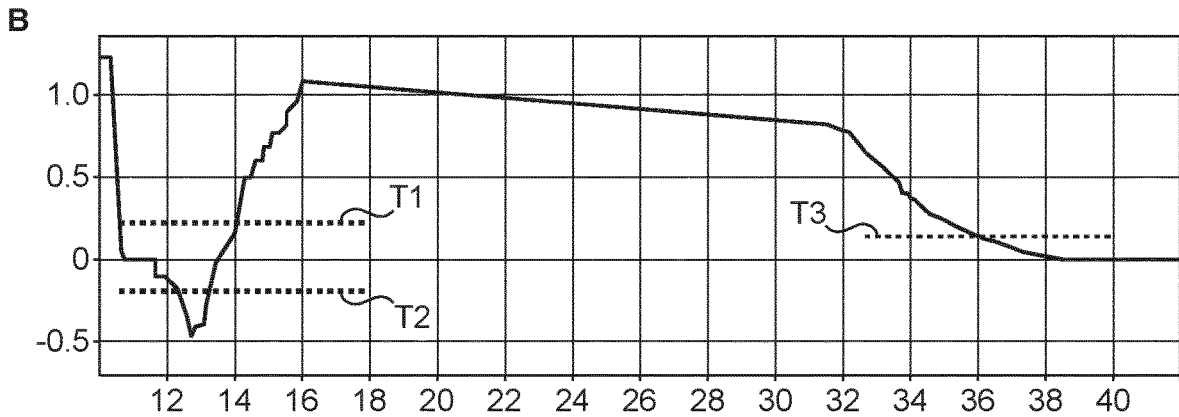
Figure 4:
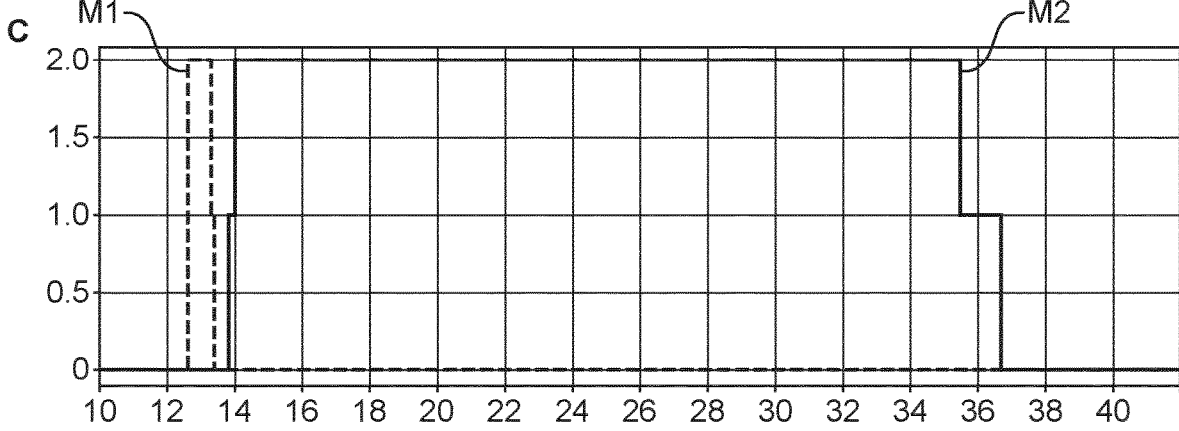

Referring to FIG. 4, a series of graphs A to C further illustrate the process described in relation to FIG. 3. Referring to graph A, this indicates that the vehicle automatic cruise control (ACC) is active, with a target velocity (generally set by the driver), and operating in follow mode (value of 1=follow mode), whereby the vehicle will increase and decrease speed to keep with a flow of traffic (based on a distance to a vehicle ahead). Values 2 and 3 in graph A represent other ACC modes (not follow mode), in which the present technique will not be applied.

Referring to graph B, this shows the magnitude (positive or negative) of acceleration demand signals being generated by the automatic cruise control system. A positive value indicates an acceleration demand (increase vehicle speed), while a negative value indicates a deceleration demand (decrease vehicle speed). The acceleration demand signal values are displayed over time in graph A, and several thresholds are marked. These thresholds are used to deactivate and deactivate (requests for) suspension modification. Threshold T1 is a positive threshold, over which an acceleration demand signal will give rise to a request to modify suspension settings to avoid or mitigate pitch backwards. Threshold T2 is a negative threshold, beneath which a deceleration demand signal (that is, an acceleration demand signal indicating a negative acceleration demand) will give rise to a request to modify suspension settings to avoid or mitigate pitch forwards. Threshold T3 is a deactivation threshold which serves as a trigger to deactivate the pitch modification after the request to modify suspension settings occurs in response to the threshold T1 being exceeded.

In Graph B, initially, the acceleration demand signal drops below the threshold T2, causing the pitch adjustment function to request a negative feed forwards pitch gain modification at the suspension control system. This corresponds to stage A in FIG. 3. Referring to graph C, this shows the generation of a negative pitch modification request M1 (dashed line) to adjust the suspension parameters to mitigate for pitch forwards in response to the acceleration signal shown in graph B dropping below the threshold T2. This negative pitch modification request lasts only a short time, until a deactivation threshold in the negative direction (not shown in the graph) is exceeded. There is then a brief period during which no pitch modification requests are active. After this, the automatic cruise control system demands the vehicle to increase speed, triggering a positive pitch modification feed forward gain request once the threshold T1 is exceeded. This corresponds to scenario B in FIG. 3. Graph C shows a positive pitch modification request M2 (solid line) corresponding to this demand, which lasts an extended period, until the acceleration demand signal drops to below the threshold T3, at which point the request is deactivated. At this point, the suspension system returns to normal settings. Following this, no pitch modification requests are active.

The present technique links together operation of an adaptive cruise control system and an adaptive suspension system to enhance driver and passenger comfort during changes in velocity due to changes in automatic cruise control vehicle speed requests/demands by emphasising pitch control.

Figure 5:
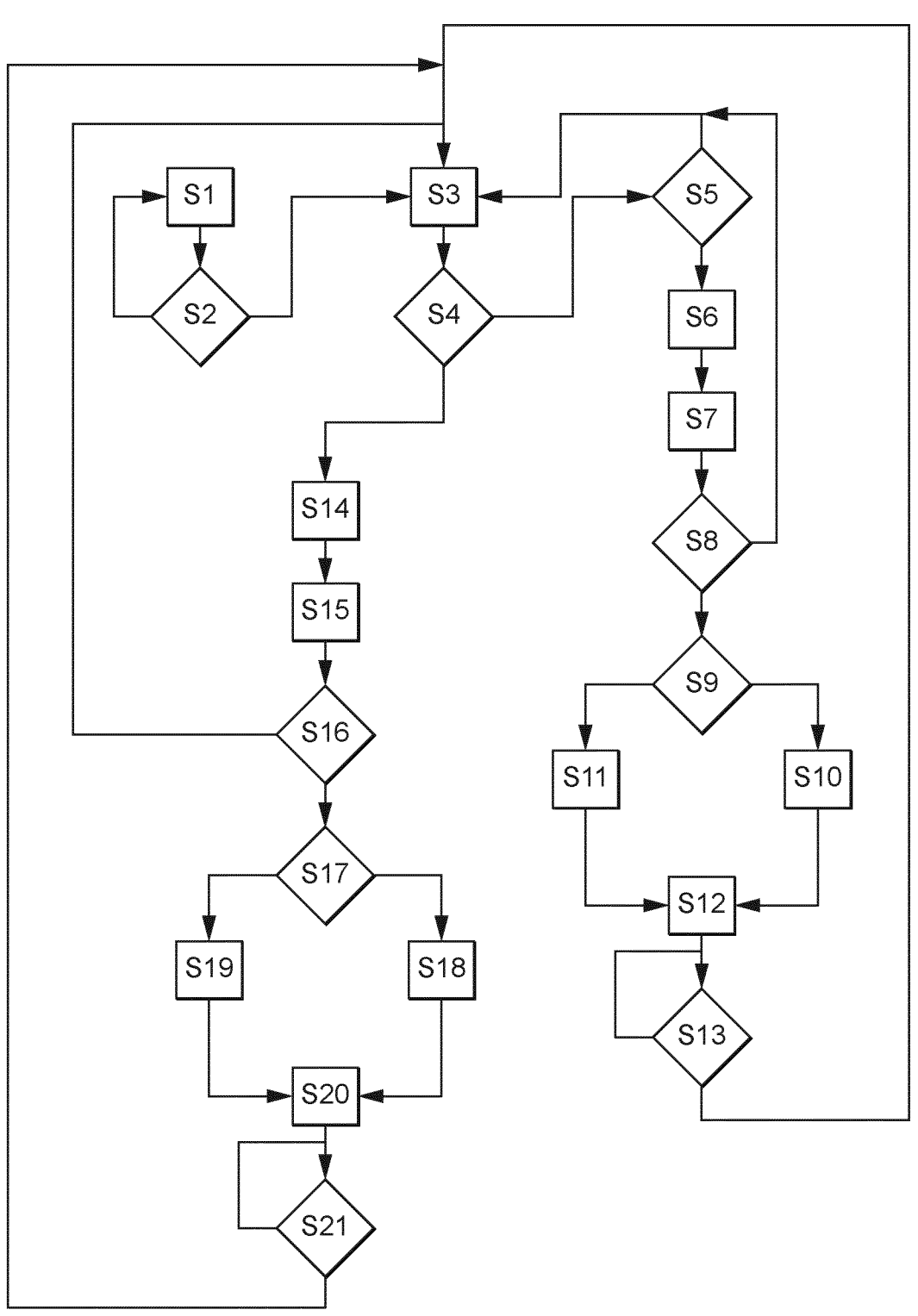
FIG. 5 shows a schematic flow diagram of the control method.

Referring to FIG. 5, an example control method according to one embodiment is illustrated by way of a flow diagram.

At a step S1, a current driving mode is determined. In particular, in some embodiments the pitch control method is only applicable in certain driving moves, such as comfort modes or economy driving modes. The pitch control method may not apply where the vehicle is in a dynamic or sports mode or when in off-road modes for example. Based on the present driving mode, it is determined at a step S2 whether the pitch adjustment functionality is available. If not, the process of FIG. 5 returns to the step S1, and is on hold until the driving mode changes at the step S1. If the pitch adjustment functionality is determined to be available at the step S2, then at a step S3 the road ahead is monitored for vehicles by the cruise control system.

At a step S4, it is determined whether an area in front of the vehicle is clear for at least a predetermined distance. If the area is clear for at least this distance, then at a step S5 it is determined whether the current vehicle speed is less than a set speed for the automatic cruise control system. If not, then no action is taken (in relation to vehicle speed change and the pitch adjustment), then the process returns to the step S3. If the current vehicle speed is less that the set speed, then at a step S6 an acceleration demand signal is generated and published on the network 120. In practice, the steps S3 and S4 are ongoing since these are part of the cruise control system. As such, the steps S3 and S4 are carried out in parallel with the steps S1 and S2, and also with the subsequent steps described below.

At a step S7, the acceleration demand signal generated at the step S6 is detected by the pitch adjustment function hosted on the DADC 118. At a step S8, an amount of acceleration indicated by the acceleration demand signal is compared with a first threshold. If the amount of acceleration required is less than the first threshold, no action is taken to modify the suspension system to account for pitch backwards, and the process returns to the step S3. If the amount of acceleration required is greater than the first threshold, then at a step S9 the amount of acceleration required is compared with a second threshold. If the amount of acceleration required is determined to be less than the second threshold (but greater than the first threshold) then the pitch adjustment function requests, at a step S10, the adaptive suspension controller 124 to adjust the suspension settings by a first amount, and in particular to set the suspension settings to at least partially counteract pitching backwards of the vehicle by adjusting gains of a control algorithm to a first value (for example 10%). If the amount of acceleration required is determined at the step S9 to be greater than the second threshold then the pitch adjustment function requests, at a step S11, the adaptive suspension controller 124 to adjust the suspension settings by a second amount, and in particular to set the suspension settings to at least partially counteract pitching backwards of the vehicle by adjusting gains of a control algorithm to a first value (for example 20%). That is, if the amount of acceleration demanded is greater, the level of adjustment of the suspension settings is accordingly influenced more strongly to compensate for the likely greater degree of backward pitching of the vehicle.

At a step S12, the adaptive suspension controller 124 adjusts the suspension settings accordingly, in response to the request. It will therefore be appreciated that the step S12 puts the vehicle suspension system into a state in which the acceleration of the vehicle will be less prone to pitching the vehicle backwards.

At a step S13, an end condition is monitored for, in order that the vehicle suspension system can revert to normal operation at the earliest suitable time. This is achieved by monitoring the acceleration demand signal, and determining when it drops below a third threshold. The third threshold may be the same as the first threshold or the second threshold, or may be different. For example, the third threshold may be set lower than the first threshold in order to avoid flip-flopping. In one implementation the greater level of adjustment applied when the second threshold is exceeded may be reduced to the lower level of adjustment when demanded acceleration drops below the second threshold but remains above the first threshold, and then switched to normal settings when the demanded acceleration drops below the first threshold. When the end condition is detected and the settings returned to normal, the process reverts to the step S3.

If at the step S4 it is determined that the area in front of the vehicle is not clear for at least the predetermined distance, then at a step S14 a deceleration demand signal is generated. At a step S15, the deceleration demand signal generated at the step S14 is detected by the pitch adjustment function hosted on the DADC 118. At a step S16, an amount of deceleration indicated by the deceleration demand signal is compared with a fourth threshold. If the amount of deceleration required is less than the fourth threshold, no action is taken to modify the suspension system to account for pitch forwards, and the process returns to the step S3. If the amount of deceleration required is greater than the fourth threshold, then at a step S17 the amount of deceleration required is compared with a fifth threshold. If the amount of deceleration required is determined to be less than the fifth threshold (but greater than the fourth threshold) then the pitch adjustment function requests, at a step S18, the adaptive suspension controller 124 to adjust the suspension settings by a first amount, and in particular to set the suspension settings to at least partially counteract pitching forwards of the vehicle by adjusting gains of a control algorithm to a first value (for example 10%). If the amount of deceleration required is determined to be greater than the sixth threshold then the pitch adjustment function requests, at a step S19, the adaptive suspension controller 124 to adjust the suspension settings by a second amount, and in particular to set the suspension settings to at least partially counteract pitching backwards of the vehicle by adjusting gains of a control algorithm to a first value (for example 20%). That is, if the amount of deceleration demanded is greater, the level of adjustment of the suspension settings is accordingly influenced more strongly to compensate for the likely greater degree of forward pitching of the vehicle.

At a step S20, the adaptive suspension controller 124 adjusts the suspension settings accordingly, in response to the request. It will therefore be appreciated that the step S20 puts the vehicle suspension system into a state in which the deceleration of the vehicle will be less prone to pitching the vehicle forwards.

At a step S21, an end condition is monitored for, in order that the vehicle suspension system can revert to normal operation at the earliest suitable time. This is achieved by monitoring the deceleration demand signal, and determining when it drops below a sixth threshold. The sixth threshold may be the same as the fourth threshold or the fifth threshold, or may be different. For example, the sixth threshold may be set lower than the fifth threshold in order to avoid flip-flopping. In one implementation the greater level of adjustment applied when the fifth threshold is exceeded may be reduced to the lower level of adjustment when demanded deceleration drops below the fifth threshold but remains above the fourth threshold, and then switched to normal settings when the demanded deceleration drops below the fourth threshold. When the end condition is detected and the settings returned to normal, the process reverts to the step S3.

It will be appreciated that the acceleration demand signal and the deceleration demand signal may in practice be a single type of signal, but containing a value which can range from a positive number (for example indicative of a demand for positive acceleration, in a forwards direction of the vehicle, to increase the forwards speed of the vehicle) and a negative number (for example indicative of a demand for negative acceleration, or deceleration, to decrease the forwards speed of the vehicle).

As explained above, the suspension adjustments taking place in response to an acceleration demand may differ from those in response to a deceleration demand. For example, in the case of an acceleration demand the first amount may be 10%, and the second amount 20%, while in the case of a deceleration demand the first amount may be 20%, and the second amount 40%. This is merely one example, and the specific amounts used (and whether an acceleration demand or deceleration demand will give rise to greater adjustments for a given level of acceleration/deceleration) will be a matter of specific implementation and vehicle tuning.

This present technique makes use of existing hardware, software and data provision capabilities to achieve its aim, particularly an existing active suspension system and existing cruise control system. These two systems are conventionally not linked together, but in the present case are linked via the control methodology described above.

From the above it will be understood that an algorithm, hosted by the DADC, is connected to the vehicle's network and is able to modify the behaviour of the suspension control system, for example by adjusting pitch control severity. This algorithm continuously reads and monitors the cruise control system's requests/demands for increased or decreased acceleration from the brakes and powertrain systems. By monitoring the severity of the requested demands (that is, the amount of acceleration or deceleration demanded), the algorithm is able to determine if the demanded acceleration or deceleration is great enough to warrant a change in suspension behaviour to counter-act the side effect of excessive pitch motion.

If the algorithm deems the severity to be great enough, it will request an increase in pitch control from the suspension control system in either direction of pitch: pitch forward, if a deceleration is demanded, or pitch backwards, if an acceleration is demanded. The suspension control system with a heightened state of pitch control, will increase control by means of increased damping rate and/or increased spring rate.

The ACC system, when active and in follow mode (monitoring the road ahead for traffic, and accelerating or braking accordingly), continually broadcasts acceleration demands over the vehicle's network to the brakes and powertrain control systems to enact its demand. By reading this requested input, an independent algorithm in communication with the suspension control system can monitor these signals and determine if the demand exceeds a calibratable threshold value (in the case of acceleration) or drops below a separate calibratable threshold value (in the case of deceleration) as an identification of the severity of the manoeuvre.

If the algorithm notices either, it will then request from the suspension control system a heightened state of pitch control in the appropriate direction: increased pitch forward control in the case of a deceleration and increased pitch reverse damping in the case of an acceleration request, to counteract the expected vehicle body motion.

The requested intervention can manifest itself in multiple increasing levels of severity (for the suspension control system to respond in increasing levels of control) based upon the value of the threshold the automatic cruise controls requested acceleration has exceeded. That is, several calibratable threshold values can exist in either direction of monotonically increasing value.

Once the suspension control system has received the request for increased levels of pitch control, it then has the ability to increase control, after arbitrations with other non-related inputs, via current control of adaptive damping hardware and adjustable spring rate air-springs.

The ability to adjust the suspension system to pre-emptively react to changes in vehicle acceleration due to demands made by an automatic cruise control system results in an enhancement to overall driver and passenger comfort. The temporary increases in pitch control may prevent or at least reduce excessive forward/backwards head-toss motion for the driver and occupants. The targeted and temporary increases in this damping also prevent excessive damping in situations where it is not needed, preventing or reducing corruption of the vehicle's ability to isolate the cabin from road disturbances.

It will be appreciated that various changes and modifications can be made to the present invention without departing from the scope of the present application. For example, all of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A control system for a vehicle having a vehicle suspension system, the control system comprising one or more controllers, the control system configured to:
   receive an acceleration or deceleration demand signal from an automatic cruise control system; and
   request modification of one or more parameters of the vehicle suspension system in response to the received acceleration or deceleration demand signal,
   wherein modification of the one or more parameters of the vehicle suspension system in response to the received acceleration or deceleration demand signal occurs in advance of the vehicle accelerating or decelerating in response to the received acceleration or deceleration demand signal.

2. The control system of claim 1, wherein the one or more controllers collectively comprise:
   at least one electronic processor having an electrical input for receiving the acceleration or deceleration demand signal; and
   at least one memory device electrically coupled to the at least one electronic processor and having instructions stored therein;
   and wherein the at least one electronic processor is configured to access the at least one memory device and execute the instructions thereon so as to modify the one or more parameters of the vehicle suspension system.

3. The control system of claim 1, the control system being configured to calculate a theoretical pitch change to the vehicle in dependence on the received acceleration or deceleration demand signal, the control system being configured to request said modification to oppose the theoretical pitch change.

4. The control system of claim 1, wherein in the case of an acceleration demand signal the vehicle suspension system is modified to at least partially counteract pitch backwards motion of the vehicle, and in the case of a deceleration demand signal, the vehicle suspension system is modified to at least partially counteract pitch forwards motion of the vehicle.

5. The control system of claim 1, the control system being configured to compare a rate of acceleration or deceleration indicated by the acceleration or deceleration demand signal with a threshold, and to request modification of the one or more parameters of the vehicle suspension system in dependence on a result of the comparison.

6. The control system according to claim 5, wherein in the case of an acceleration demand signal, the rate of acceleration demanded is compared with a first threshold, and the request to modify the one or more parameters of the vehicle suspension system is made if the rate of positive acceleration exceeds the first threshold, and in the case of a deceleration demand signal, the rate of deceleration demanded is compared with a second threshold, and the request to modify the one or more parameters of the vehicle suspension system is made if the rate of deceleration is greater than the second threshold.

7. The control system according to claim 1, wherein an amount by which the one or more parameters are requested to be modified is dependent on a rate of acceleration or deceleration indicated by the acceleration or deceleration demand signal.

8. The control system according to claim 1, wherein the one or parameters comprises a spring rate and/or a damping rate of one or more elements of the vehicle suspension system, and the modification comprises increasing the spring rate and/or the damping rate of the one or more elements.

9. The control system according to claim 1, wherein the control system is configured to revert the one or more parameters to their previous settings in response to a reduction in a rate of acceleration to below a predetermined deactivation threshold.

10. The control system of claim 1, wherein the one or more controllers comprise a first controller for generating the acceleration or deceleration demand signal, a second controller for receiving the acceleration or deceleration demand signal and responsive to receipt of the acceleration or deceleration demand signal generating a suspension modification request to modify the one or more parameters of the vehicle suspension system, and a third controller for receiving the suspension modification request and responsive to the suspension modification request to modify the one or more parameters of the vehicle suspension system.

11. The control system of claim 10, wherein the third controller is configured to generate a control output to control the one or more parameters of the vehicle suspension system, in dependence on one or more driver and/or road inputs and the request.

12. A vehicle comprising a suspension system, an adaptive cruise control system, and the control system according to claim 1.

13. A method for controlling vehicle suspension, the method comprising:

receiving an acceleration demand signal from an automatic cruise control system; and requesting modification of one or more parameters of a vehicle suspension system in response to the received acceleration demand signal, wherein modification of the one or more parameters of the vehicle suspension system in response to the received acceleration demand signal occurs in advance of the vehicle accelerating in response to the received acceleration demand signal.

14. Computer software that, when executed by at least one electronic processor, is arranged to cause the at least one electronic processor to perform the method according to claim 13.

\* \* \* \* \*